US008885012B2

(12) United States Patent
Bustamente

(10) Patent No.: US 8,885,012 B2
(45) Date of Patent: Nov. 11, 2014

(54) SYSTEM AND METHOD FOR PROVIDING ANONYMITY IN A VIDEO/MULTIMEDIA COMMUNICATIONS SESSION OVER A NETWORK

(75) Inventor: Michael G. Bustamente, Frisco, TX (US)

(73) Assignee: Match.com, L.L.C., Dallas, TX (US)

( * ) Notice: Subject to any disclaimer, the term of this patent is extended or adjusted under 35 U.S.C. 154(b) by 1044 days.

(21) Appl. No.: 12/436,869

(22) Filed: May 7, 2009

(65) Prior Publication Data
US 2010/0283827 A1 Nov. 11, 2010

(51) Int. Cl.
*H04N 7/14* (2006.01)
*H04L 29/12* (2006.01)
*H04L 29/06* (2006.01)
*H04M 3/42* (2006.01)
*H04M 3/56* (2006.01)

(52) U.S. Cl.
CPC .......... *H04N 7/147* (2013.01); *H04L 29/12433* (2013.01); *H04L 65/1076* (2013.01); *H04M 2201/50* (2013.01); *H04L 61/2539* (2013.01); *H04L 63/0407* (2013.01); *H04M 3/567* (2013.01); *H04L 65/1069* (2013.01); *H04L 65/1006* (2013.01); *H04M 3/42008* (2013.01)
USPC .................... 348/14.08; 348/14.01; 348/14.12

(58) Field of Classification Search
CPC .................... H04L 28/01697; H04L 29/06326; H04L 29/0634; H04L 29/12433; H04L 61/2539; H04N 7/14
USPC ............ 348/14.01–14.16; 370/260, 261, 389, 370/395.2; 709/206, 209, 207, 204
See application file for complete search history.

(56) References Cited

U.S. PATENT DOCUMENTS

| | | | |
|---|---|---|---|
| 6,175,619 B1 * | 1/2001 | DeSimone | 379/202.01 |
| 6,408,001 B1 | 6/2002 | Chuah et al. | |
| 6,564,261 B1 | 5/2003 | Gudjonsson et al. | |
| 6,680,943 B1 | 1/2004 | Gibson et al. | |
| 6,865,161 B1 * | 3/2005 | Sponaugle et al. | 370/261 |
| 7,139,811 B2 | 11/2006 | Lev Ran et al. | |
| 7,151,749 B2 | 12/2006 | Vega-Garcia et al. | |
| 7,171,482 B2 | 1/2007 | Jones et al. | |
| 7,203,674 B2 | 4/2007 | Cohen | |
| 7,394,811 B2 | 7/2008 | Gibson et al. | |
| 7,440,562 B2 | 10/2008 | Barnes et al. | |

(Continued)

OTHER PUBLICATIONS

Rosenberg et al., "SIP: Session Initiation Protocol", Networking Group Request for Comments: 3261, Jun. 2002.*

(Continued)

*Primary Examiner* — Melur Ramakrishnaiah
(74) *Attorney, Agent, or Firm* — Patent Capital Group

(57) ABSTRACT

In one example embodiment, a method for facilitating an anonymous video/multimedia communication session in a communications environment over a network is provided that includes receiving, from a first endpoint, a request for a communication session involving a second endpoint. The method also includes identifying end user data associated with both endpoints. The data associated with the first endpoint is mapped to an identity of the first endpoint. The second endpoint can be shown the identity of the first endpoint and not the end user data associated with the first endpoint. Also, the data associated with the second endpoint can be mapped to an identity of the second endpoint. The first endpoint is shown the identity of the second endpoint and not the end user data associated with the second endpoint.

29 Claims, 3 Drawing Sheets

(56) References Cited

U.S. PATENT DOCUMENTS

| | | | |
|---|---|---|---|
| 7,478,161 B2 | 1/2009 | Bernet et al. | |
| 7,486,696 B2 | 2/2009 | Garg et al. | |
| 7,499,720 B2 | 3/2009 | Idnani | |
| 7,539,127 B1 | 5/2009 | Shaffer et al. | |
| 7,630,486 B2 | 12/2009 | Lee et al. | |
| 7,640,293 B2 | 12/2009 | Wilson et al. | |
| 7,649,881 B2 | 1/2010 | Casey | |
| 7,792,065 B2 | 9/2010 | Jepson et al. | |
| 8,051,130 B2 | 11/2011 | Logan et al. | |
| 8,281,027 B2 | 10/2012 | Martinez et al. | |
| 8,316,134 B2 | 11/2012 | Tanimoto | |
| 8,621,090 B2 | 12/2013 | Bustamente | |
| 2002/0041590 A1 | 4/2002 | Donovan | |
| 2003/0224792 A1 | 12/2003 | Verma et al. | |
| 2003/0235209 A1 | 12/2003 | Garg et al. | |
| 2004/0030747 A1 | 2/2004 | Oppermann | |
| 2005/0246419 A1 | 11/2005 | Jaatinen | |
| 2005/0276268 A1* | 12/2005 | Poikselka et al. | 370/395.2 |
| 2006/0045243 A1* | 3/2006 | Durga et al. | 379/88.19 |
| 2006/0276268 A1* | 12/2006 | Hung | 473/387 |
| 2006/0281407 A1* | 12/2006 | Deeds | 455/41.2 |
| 2007/0019545 A1 | 1/2007 | Alt et al. | |
| 2007/0064895 A1* | 3/2007 | Wong et al. | 379/142.09 |
| 2007/0071223 A1 | 3/2007 | Lee et al. | |
| 2007/0201480 A1 | 8/2007 | Bao et al. | |
| 2007/0282621 A1 | 12/2007 | Altman et al. | |
| 2008/0070697 A1* | 3/2008 | Robinson et al. | 463/42 |
| 2008/0104227 A1 | 5/2008 | Birnie et al. | |
| 2008/0144615 A1 | 6/2008 | Casey | |
| 2008/0255989 A1 | 10/2008 | Altberg et al. | |
| 2009/0024741 A1 | 1/2009 | Roach | |
| 2009/0322597 A1 | 12/2009 | Medina-Herrero et al. | |
| 2010/0071053 A1 | 3/2010 | Ansari et al. | |
| 2010/0077017 A1 | 3/2010 | Martinez et al. | |
| 2010/0083364 A1 | 4/2010 | Fernandez Gutierrez | |
| 2010/0088246 A1 | 4/2010 | Lim | |
| 2010/0099389 A1 | 4/2010 | Zhu et al. | |
| 2010/0106842 A1 | 4/2010 | Cosmadopoulos et al. | |
| 2010/0195488 A1 | 8/2010 | Mehrotra et al. | |
| 2010/0217837 A1 | 8/2010 | Ansari et al. | |
| 2010/0217876 A1 | 8/2010 | Fikouras et al. | |
| 2010/0241755 A1 | 9/2010 | Bassett et al. | |
| 2010/0246576 A1 | 9/2010 | Bustamente | |
| 2010/0260174 A1 | 10/2010 | Preiss et al. | |
| 2010/0285856 A1 | 11/2010 | Thomas | |
| 2010/0287286 A1 | 11/2010 | Bustamente | |
| 2011/0182205 A1 | 7/2011 | Gerdes et al. | |
| 2011/0313647 A1 | 12/2011 | Koebler | |
| 2013/0003718 A9 | 1/2013 | daCosta et al. | |
| 2013/0232213 A1 | 9/2013 | Bustamente | |
| 2013/0238708 A1 | 9/2013 | Bustamente | |
| 2014/0082087 A1 | 3/2014 | Bustamente | |

OTHER PUBLICATIONS

Final Office Action in U.S. Appl. No. 12/415,839 mailed on Jun. 23, 2011.
Response to Non-Final Office Action dated Apr. 28, 2011 in U.S. Appl. No. 12/436,912, filed Jul. 28, 2011.
Examiner Interview Summary in U.S. Appl. No. 12/415,839 mailed on Sep. 27, 2011.
Non-Final Office Action in U.S. Appl. No. 12/415,839 mailed on Oct. 13, 2011.
Final Office Action in U.S. Appl. No. 12/436,912 mailed on Oct. 11, 2011.
Request for Continued Examination and Amendment in U.S. Appl. No. 12/436,912, filed Dec. 8, 2011.
Rosenberg et al., "SIP: Session Initiation Protocol", Network Working Group Request for Comments: 3261, Jun. 2002 (202 pages).
Non-Final Office Action in U.S. Appl. No. 12/415,839 mailed on Feb. 18, 2011.
Response to Non-Final Action dated Feb. 18, 2011 in U.S. Appl. No. 12/415,839, filed May 18, 2011.
Non-Final Office Action in U.S. Appl. No. 12/436,912 mailed on Apr. 28, 2011.
Request for Continued Examination and Amendment in U.S. Appl. No. 12/415,839, filed Sep. 22, 2011.
Response to Non-Final Action dated Oct. 13, 2011 in U.S. Appl. No. 12/415,839, filed Jan. 13, 2012.
Offringa, Peter "Zoosk—The Engineering behind Real Time Communications," available online at <URL http://highscalability.com/blog/2012/8/27/zoosk-the-engineering-behind-real-time-communications.html>, Aug. 27, 2012 (4 pages).
Zoosk Customer Support, "How Do I Video Chat?" available online at <URL https://zoosk.zendesk.com/entries/20513017-how-do-i-video-chat> Oct. 7, 2011 (3 pages).
Fiore, Andrew, et al., "Online Personals: An Overview," CHI 2004, Apr. 24-12, 2004, Vienna, Austria (pp. 1395-1398).
Final Office Action in U.S. Appl. No. 12/415,839 mailed in Apr. 25, 2013.
Non-Final Office Action in U.S. Appl. No. 12/436,912 mailed on Nov. 27, 2012.
Response to Non-Final Office Action dated Nov. 27, 2012 in U.S. Appl. No. 12/436,912, filed Feb. 27, 2013.
U.S. Appl. No. 13/869,912, filed Apr. 24, 2013 and entitled "System and Method for Providing Calendar and Speed Dating Features for Matching Users in a Network Environment", Inventor Michael G. Bustamente.
U.S. Appl. No. 13/869,948, filed Apr. 24, 2013 and entitled "System and Method for Providing Calendar and Speed Dating Features for Matching Users in a Network Environment", Inventor Michael G. Bustamente.
Request for Continued Examination and Amendment in U.S. Appl. No. 12/415,839, filed Jul. 25, 2013.
Non-Final OA in U.S. Appl. No. 12/415,839 mailed on Aug. 16, 2013.
Response to Non-Final Office Action dated Aug. 16, 2013 in U.S. Appl. No. 12/415,839 filed Nov. 16, 2013.
Final Office Action in U.S. Appl. No. 12/415,839 mailed on Jun. 6, 2014.
Notice of Allowance in U.S. Appl. No. 12/436,912 mailed on Jul. 18, 2013.
U.S. Appl. No. 14/088,387 filed Nov. 23, 2013 and entitled System and Method for Providing Sequenced Anonymous Communication Sessions Over a Network, Inventor Michael G. Bustamente.

* cited by examiner

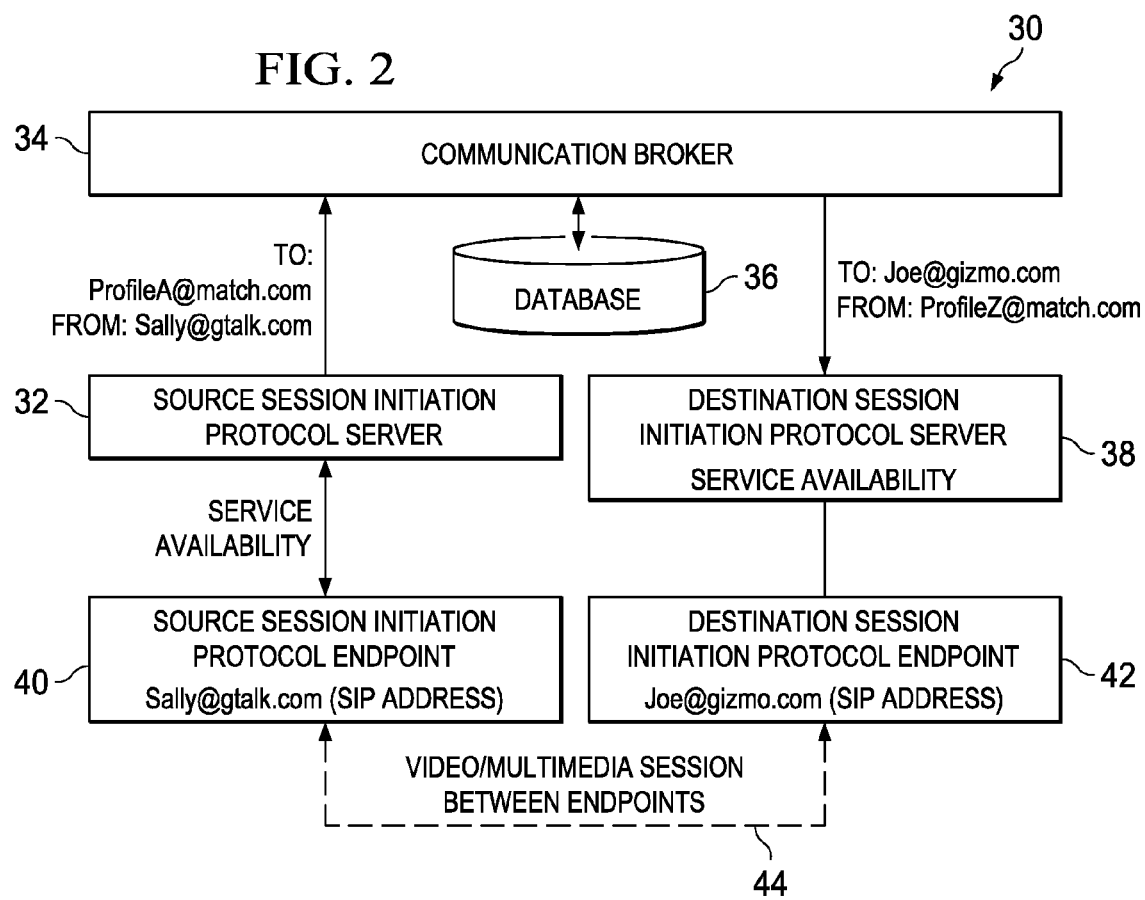

SYSTEM AND METHOD FOR PROVIDING ANONYMITY IN A VIDEO/MULTIMEDIA COMMUNICATIONS SESSION OVER A NETWORK

RELATED APPLICATIONS

The present application is related to the following applications: (1) U.S. application Ser. No. 12/415,839 filed Mar. 31, 2009, entitled "System and Method for Providing Anonymity in a Session Initiated Protocol Network," Inventor Michael G. Bustamente; and (2) the application filed contemporaneously herewith identified by U.S. application Ser. No. 12/436,912, filed May 7, 2009, entitled "System and Method for Providing Sequenced Anonymous Communication Sessions Over a Network," Inventor Michael G. Bustamente. The disclosure of these related applications are considered part of (and are incorporated by reference in) the disclosure of this application.

TECHNICAL FIELD

This disclosure relates in general to the field of communications and, more particularly, to a system and a method for user anonymity in a multimedia environment utilizing Transmission Control Protocol/Internet Protocol (TCP/IP) in a network.

BACKGROUND

Electronic architectures have experienced significant notoriety because they can offer the benefits of automation, convenience, and data management for their respective online communities. Certain network protocols may be used in order to allow an end user to be matched to other end users or to scenarios in which they stand to benefit (e.g., job searches, person-finding services, real estate searches, online dating, etc.).

In some cases, end users desire that their identity, address, or other personal information remain anonymous. The ability to initiate a multimedia communication session, more specifically a videoconference or video multimedia session, between two users while maintaining anonymity, without exchanging personal information, offers a significant challenge to online communities, network operators, administrators, and device manufacturers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a diagram illustrating a network for providing anonymous video SIP communications in accordance with one embodiment of the disclosure disclosed herein;

FIGS. 3A and 3B are block diagrams illustrating a packet network address translation context in accordance with one embodiment of the disclosure disclosed herein.

DETAILED DESCRIPTION OF EXAMPLE EMBODIMENTS

Figure 1:
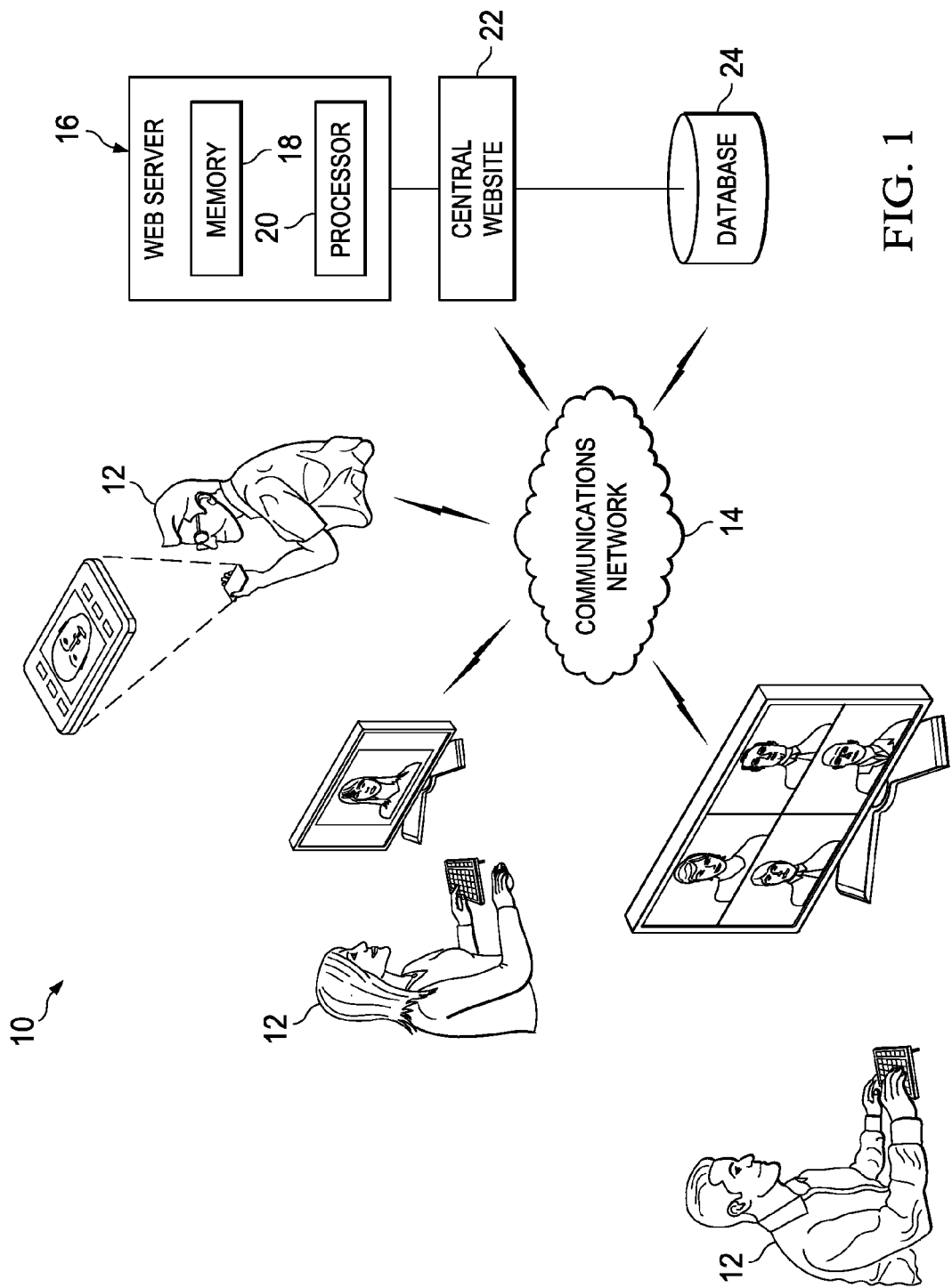
FIG. 1 is a network diagram showing an operating environment of the present disclosure in accordance with one embodiment of the present disclosure.

FIG. 1 is a simplified block diagram of a communication system 10 for communicating, receiving, and transmitting data in a communications environment (e.g., a SIP environment). Communication system 10 includes endpoints 12, a communications network 14, a web server 16 including memory 18 and processor 20, a central website 22, and database 24.

Endpoints 12 are clients or customers wishing to initiate a communication in communication system 10 via some network. In one example implementation, endpoints 12 are personal computers that are operable to interface with a SIP network. Note also that the term 'endpoint' may be inclusive of devices used to initiate a communication, such as a computer, a personal digital assistant (PDA), a laptop or electronic notebook, a telephone, a cellular telephone, an IP telephone, an I-Phone, or any other device, component, element, or object capable of initiating voice, audio, or data exchanges within communication system 10. Endpoints 12 may also be inclusive of a suitable interface to the human user, such as a microphone, a display, or a keyboard or other terminal equipment. Endpoints 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

Any device capable of operating as an endpoint 12 may connect to communications network 14 via wire, wireless, cellular, satellite link or other suitable interfaces. Web server 16, which includes memory 18 and processor 20, hosts central website 22 and has access to transmit and receive end user or presence data (e.g., user profile data, end user and/or user endpoint data, user contact data) from database 24. Presence data may be collected, aggregated, and utilized as required to facilitate video communications between endpoints 12 over communications network 10 or other outside communication systems. Presence data may also include information and/or instructions enabling the creation, duration, and termination of video communication sessions between diverse endpoints 12 that utilize different communication and/or networking protocols.

Central website 22 can be configured to interface with endpoints 12 and database 24, and may display data inputs from users via endpoints 12 and/or database 24. In one example, software that resides in web server 16 (which may be included within central website 22 is executed by processor 20 (potentially in conjunction with memory 18) to achieve the communication coordination, while protecting end user anonymity as outlined herein. Such activity could also be developed externally and then uploaded to web server 16 (i.e., central website 22). In an embodiment of the disclosure disclosed herein, web server 16 is defined as an Internet facing server listening on various TCP/IP ports for applicable network-based services and not specifically as a web server configured to listen for HTTP traffic on port 80, although port 80 could be utilized.

With regard to the possible items that effectuate the teachings of the present disclosure, central website 22 and/or web server 16 may include software and/or algorithms to achieve the operations for processing, communicating, delivering, gathering, uploading, maintaining, and/or generally managing data, as described herein. This includes suitably displaying some [or all] of these items. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations.

Considerable flexibility is provided by the structure of central website 22 and web server 16 in the context of system 10. Thus, it can be easily appreciated that such functions could be provided external to central website 22 and web server 16 (e.g., as a solitary and/or proprietary component). In such cases, such functionality could be readily embodied in a separate component, server, processor, device, or module. Note that these data coordination features and capabilities may be provided in just one of these elements, in both, or distributed across both of them.

For purposes of teaching and discussion, it is useful to provide some overview as to the way in which the disclosure disclosed herein operates in a SIP environment. The following information may be viewed as a basis from which the present disclosure may be properly explained. Such discussion is for purposes of explanation only and, accordingly, should not be construed in any way to limit the broad scope of the disclosure disclosed herein and its potential applications. Though the current disclosure is illustrated in the SIP environment, it is not limited to SIP and can actually apply to other multimedia over IP protocols, as well as multiplexing implementations, etc.

Many applications require the creation and management of a communication session, where a session is considered an exchange of data between an association of participants. The implementation of these applications is complicated by the practices of participants: users move between endpoints, they may be addressable by multiple names, and they may communicate in several different media (in many cases simultaneously). Certain protocols, such as SIP, VoIP, XMPP, RTMP, and H.323, have been developed to carry various forms of real-time multimedia communication session data such as voice, video, text and multimedia messages.

Reliable, flexible, multimedia and voice traffic over Internet Protocol (IP) networks have been enabled by the SIP topology. SIP is an application layer, control protocol used to establish, modify, and terminate multimedia sessions or calls. SIP provides proxy-able messages used to perform call setup, modification, and termination functions. For example, one SIP message used to perform call setup functions is the INVITE message. The INVITE message is used to invite telephony devices to participate in media stream communications, such as voice communication, data communication, video communication, or any combination thereof. The INVITE message includes a session description protocol (SDP) portion that is used by end user devices to exchange media capabilities and other information. As unified networks emerge, it is becoming increasingly important to provide communication services seamlessly across SIP based packet networks.

The SIP features of communications system 10 work in concert with these protocols by enabling endpoints 12 (which may also be referred to as "user agents") to discover one another and to agree on a characterization of a session they would like to share. For locating prospective session participants, and for other functions, SIP enables the creation of an infrastructure of network hosts (which may also be referred to as "proxy servers") to which user agents can send registrations, invitations to sessions, and other requests. SIP is an agile, general-purpose tool for creating, modifying, and terminating sessions. SIP works independently of underlying transport protocols and without dependency on the type of session that is being established.

SIP is an application-layer control protocol that can establish, modify, and terminate multimedia sessions (conferences) such as Internet telephony calls. SIP can also invite participants to already existing sessions such as multicast conferences. Media can be added to (and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both the called and calling party locations; and 5) session management: including transfer and termination of sessions, modifying session parameters, and invoking services.

A standard SIP platform does not necessarily provide services. Rather, SIP provides primitives that can be used to implement different services. For example, SIP can locate a user and deliver opaque objects to his current location. If this primitive is used to deliver a session description written in SDP, for instance, the endpoints can agree on the parameters of a session. If the same primitive is used to deliver a photo of the caller as well as the session description, a "caller id" service can be easily implemented.

In social networks, end users may desire that their identity, name, address, or other personal information remain anonymous so that other users on the network may not physically, electronically, or otherwise locate a user or utilize a user's contact information for a nefarious purpose. Thus, the ability to initiate a video communication session between two users without the exchange of personal contact information in the context of a social networking network is critical from various standpoints, including personal safety and identity theft/fraud prevention.

FIG. 2 depicts the components of a communications network 30 for providing anonymity for video/multimedia communication sessions between users. The network utilizes a source SIP server 32, a communication broker 34, a database 36, a destination SIP server 38, a source SIP endpoint 40, and a destination SIP endpoint 42. In one embodiment of the disclosure disclosed herein, a first user desires to initiate a video/multimedia communication session with a second user in a social networking environment. In a video/multimedia context, the end users can see and speak with each other, while remaining anonymous, and observe non-visual social and behavioral cues that are present in a visual environment. For example, the first user (e.g., Sally) desires to have a videoconference with a second user (e.g., Joe) whose personal profile she has reviewed on a social networking site, such as Match.com. Joe's personal contact information, which may include his SIP address (e.g., Joe@gizmo.com), is not displayed publicly on the site, but a "profile name" is used [e.g., ProfileA@match.com]). Likewise, Sally's personal contact information, which may include her SIP address (sally@gtalk.com), is not displayed publicly on the site and her profile name is used (e.g., ProfileZ@match.com). To initiate the contact process, the first user Sally utilizes an I-phone, Smartphone, personal computer or any other device capable of acting as SIP endpoint 40 to initiate a video communication session with a second user Joe, who utilizes an I-phone, Smartphone, personal computer, or other device capable of acting as a SIP endpoint. Source SIP endpoint 40 sends a service availability request to source SIP server 32. SIP server 32 responds by initiating a video/multimedia communication session invitation to communications broker 34. Communications broker 34 accesses database 36 and receives personal contact information for both the first and second users. Database 36 and/or communications broker 34 can provide the destination contact information for the call set-up process performed by communications broker 34.

FIGS. 3A and 3B describe the video/multimedia session set-up process resulting in the removal of personal contact information exchanged between a first and a second user, thereby resulting in the anonymous exchange of video/multimedia communications between users. FIG. 3A depicts a packet 50 of electronic information, which is received by communications broker 34 from source SIP server 32, as shown in FIG. 2. Packet 50 contains address information from a first user (Sally) with a personal contact address (sally@gtalk.com) requesting a video/multimedia session set-up with Joe, who has profile contact address (profileA@match.com). As discussed above and with reference to FIG. 2, communications broker 34 accesses database 36 and retrieves information for translating (i.e. "mapping"), and thereby rendering anonymous, the profile name(s), profile contact address, and personal contact information of each user. Communication broker 34 prepares packet 52, as shown in FIG. 3B, with information showing the destination personal contact address of the second user (e.g., joe@gizmo.com) from a first user profile address (profilenameZ@match.com), in this example Sally's profile contact address. By translating the personal contact information and profile names of the first and second users, communications broker 34 effectively prevents both the first and second users from transmitting or receiving any personal contact information during the video/multimedia session initiation, the video/multimedia session, and video/multimedia session teardown aspects of a SIP session.

Referring back to FIG. 2, communications broker 34 transmits a video/multimedia session invitation message addressed to a second user (joe@gizmo.com) from a first user (profileZ@match.com) to destination SIP server 38. Destination SIP server 38 sends a service availability request to destination SIP endpoint 42 (e.g., Joe's I-phone, Smartphone, personal computer) which if available and accepted by Joe, initiates a video/multimedia communication session call set-up invitation back to Sally at SIP endpoint 40 via communications broker 34. A video/multimedia communication session is then initiated directly between the users (e.g., Sally and Joe exchanging data at link 44) via their respective endpoints 40, 42, without the exchange of personal contact information. As a result, the end users may participate in a video/multimedia communication session while maintaining anonymity during the session. This allows the end users to see and speak to one another, in addition to observing other behavioral and/or nonverbal cues, while protecting their identities and personal contact information.

Figure 4:
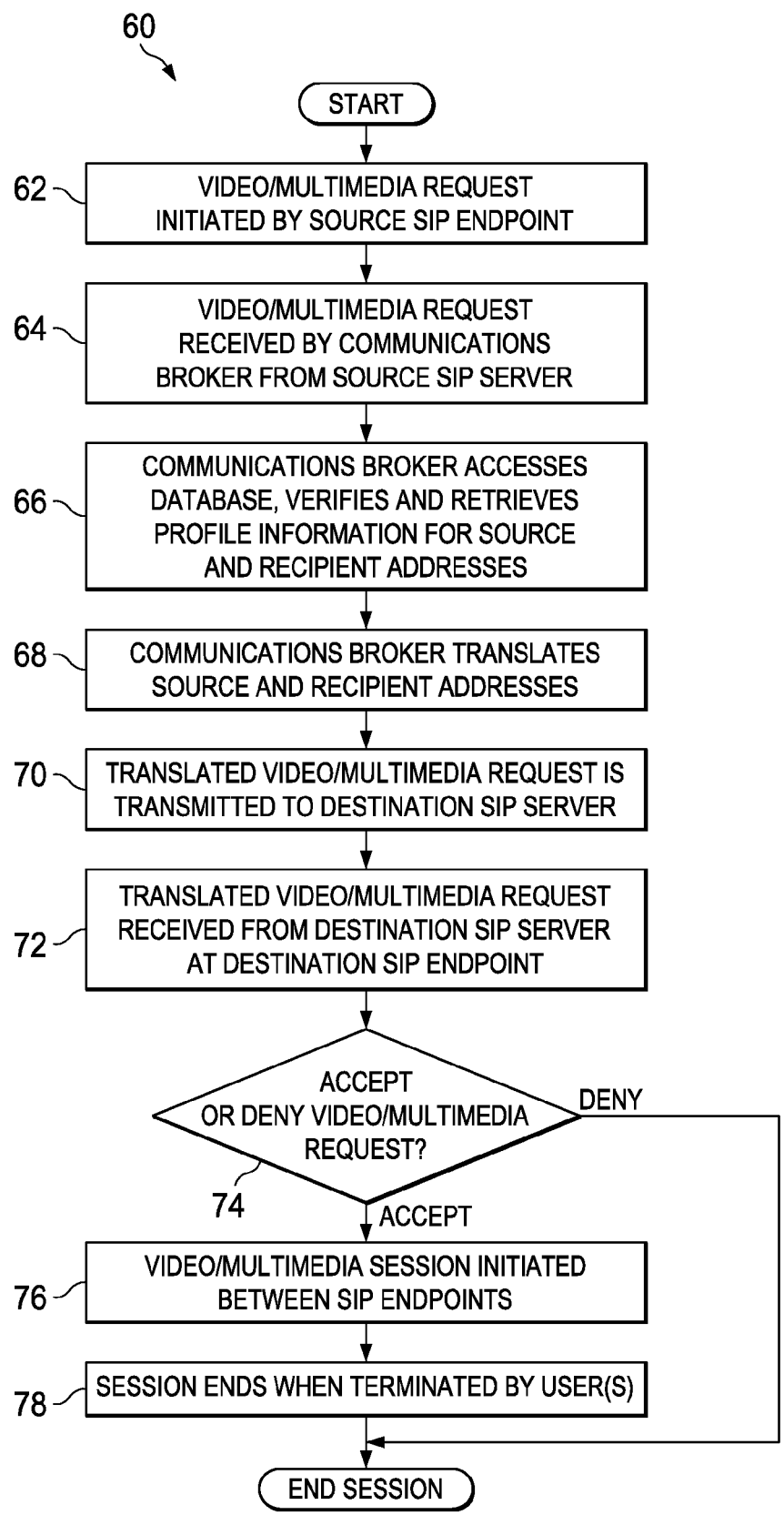
FIG. 4 is a flow diagram showing the method of one embodiment of the disclosure disclosed herein.

FIG. 4 is a flow diagram illustrating a method 60 embodiment of the disclosure disclosed herein. As previously described, a first user or source initiates a video/multimedia communications request from a SIP endpoint that is addressed to a second user or recipient (step 62) with a profile address. The video/multimedia communication is transmitted by a source SIP server and received by a communications broker (step 64). The communications broker accesses a database that verifies and retrieves the personal contact information and profile information for the first and second users associated with the source and recipient address information in the video/multimedia session request (step 66). This step may also include verification of membership status in a social networking context and other desired information that is stored on the database. The communications broker translates or "maps" the source and recipient addresses from the information retrieved from the database (step 68). The communications broker transmits the translated video/multimedia request to the recipient originating from the source profile address (step 70), with the translated call request being received by the recipient SIP endpoint from the recipient SIP server (step 72). The call recipient must then decide whether to accept or deny the video/multimedia session request (step 74). If the recipient accepts the request, a video/multimedia communication session (e.g., videoconference) is initiated between the SIP endpoints (step 76). The session can remain active until terminated by the user(s) (step 78). However, if the recipient denies the request for a communication session from the source, the session is terminated.

It is important to note that the stages and steps in FIGS. 2 through 4 illustrate only some of the possible scenarios that may be executed by, or within, the present system. Some of these stages and/or steps may be deleted or removed where appropriate, or these stages and/or steps may be modified, enhanced, or changed considerably without departing from the scope of the present disclosure. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the disclosure. Accordingly, communications capabilities, data processing features and elements, suitable infrastructure, and any other appropriate software, hardware, or data storage objects may be included within the communication system and network disclosed herein to effectuate the tasks and operations of the elements and activities associated with executing a system and method for providing anonymity in a SIP network environment.

Although the present disclosure has been described in detail with reference to particular embodiments, it should be understood that various other changes, substitutions, and alterations may be made hereto without departing from the spirit and scope of the present disclosure. The illustrated network architecture of FIG. 1 has only been offered for purposes of example and teaching. Suitable alternatives and substitutions are envisioned and contemplated by the present disclosure, with such alternatives and substitutions being clearly within the broad scope of communication system 10. For example, use of a local area network (LAN) for the outlined communications could be easily replaced by a virtual private network (VPN), a metropolitan area network (MAN), a wide area network (WAN), a wireless local area network (WLAN), or any other element that facilitates data propagation for SIP endpoints or telephone branch offices. In addition, while the foregoing discussion has focused on SIP, any other suitable session protocol may benefit from the teachings provided herein. The present disclosure is not to be construed as being confined to the SIP platform or its proscriptions.

In addition, some of the steps illustrated in the preceding FIGURES may be changed or deleted where appropriate and additional steps may be added to the process flows. These changes may be based on specific communication architectures or particular interfacing arrangements and configurations of associated elements and do not depart from the scope or the teachings of the present disclosure. It is important to recognize that the FIGURES illustrate just one of a myriad of potential implementations of system 10.

Numerous other changes, substitutions, variations, alterations, and modifications may be ascertained to one skilled in the art and it is intended that the present disclosure encompass all such changes, substitutions, variations, alterations, and modifications as falling within the spirit and scope of the appended claims.

What is claimed is:

1. A method, comprising:
   receiving, from a first endpoint, via a session initiation protocol (SIP) server, a request for a video/multimedia communication session in a social networking environment involving a second endpoint, wherein the request specifies the first endpoint by a personal contact information comprising a SIP address, wherein the request includes the SIP address as a source address;
   identifying end user data associated with the first endpoint, wherein the identifying includes accessing a database that verifies and retrieves the end user data, wherein the end user data includes a profile contact address, wherein the profile contact address is mapped to the personal contact information, and wherein the second endpoint is shown the profile contact address of the first endpoint and not the personal contact information associated with the first endpoint;
   translating the request, the translating comprising replacing the SIP address in the source address with the profile contact address; and
   transmitting the translated request to the second endpoint, via another SIP server.

2. The method of claim 1 further comprising:
   identifying a second end user data associated with the second endpoint, wherein the second end user data includes a second profile contact address, wherein the second profile contact address is mapped to a second personal contact information of the second endpoint, wherein the second personal contact information comprises a second SIP address, wherein the request includes the second profile contact address as a destination address, and wherein the first endpoint is shown the second profile contact address of the second endpoint and not the second personal contact information associated with the second endpoint; and
   replacing the second profile contact address in the destination address with the second SIP address.

3. The method of claim 2 further comprising:
   identifying a plurality of additional endpoints wherein the data associated with each endpoint is mapped to a respective profile contact address and no endpoint displays personal contact information associated with any other endpoint.

4. The method of claim 1, wherein the second endpoint is operable to recognize that the first endpoint is seeking to contact the second endpoint to initiate the communication session.

5. The method of claim 1, wherein the end user data includes an Internet protocol address.

6. The method of claim 1, wherein the endpoint is selected from one of a group of endpoints, the group consisting of:
   a) a personal computer;
   b) a laptop computer;
   c) a personal digital assistant;
   d) an Internet Protocol (IP) telephone;
   e) a standard telephone;
   f) an I-Phone; and,
   g) a mobile phone.

7. The method of claim 1, further comprising:
   prompting the second endpoint to respond to the request in order to initiate the communication session.

8. The method of claim 1, wherein the communication session does not occur if the second endpoint declines the request.

9. The method of claim 1, wherein a communication broker serves as an intermediary between the first and second endpoints during the communication session.

10. The method of claim 9, wherein the communication broker is authorized to terminate the communication session.

11. The method of claim 1, wherein the end user data includes the SIP address.

12. The method of claim 1, wherein the end user data includes an IP address.

13. The method of claim 1, wherein the profile contact address is a user name that an end user of the first endpoint has selected.

14. The method of claim 1, wherein the request is for a video/multimedia communication session through which respective users at the first endpoint and the second endpoint can see and speak with each other.

15. An apparatus, comprising:
    a communications broker that receives from a first endpoint, via a SIP server, a request for a video/multimedia communication session in a social networking environment involving a second endpoint, wherein the request specifies the first endpoint by a personal contact information, comprising a SIP address, wherein the request includes the SIP address as a source address, wherein the communication broker can identify end user data associated with the first endpoint, wherein the identifying includes accessing a database that verifies and retrieves the end user data, wherein the end user data includes a profile contact address, profile contact address is mapped to the personal contact information, wherein the second endpoint is shown the profile contact address of the first endpoint and not the personal contact information associated with the first endpoint, wherein the communications broker can translate the request, the translating comprising replacing the SIP address in the source address with the profile contact address, and wherein the communications broker can transmit the translated request to the second endpoint, via another SIP server.

16. The apparatus of claim 15 wherein the communications broker receives from the second endpoint, a response to the request for a communication session involving the first endpoint, wherein the communication broker can identify a second end user data associated with the second endpoint, wherein the second end user data includes a second profile contact address, wherein the second profile contact address is mapped to a second personal contact information of the second endpoint, wherein the second personal contact information comprises a second SIP address, and wherein the first endpoint is shown the second profile contact address of the second endpoint and not the second personal contact information associated with the second endpoint.

17. The apparatus of claim 15 wherein the communications broker receives, from a plurality of additional endpoints, responses to a request for a communication session involving the first or second endpoint, wherein the communication broker can identify end user data associated with the additional endpoints, wherein the data associated with the additional endpoints are mapped to respective profile contact addresses, and wherein the remote endpoints are shown the respective profile contact address of each endpoint and not personal contact information associated with the remote endpoints.

18. The apparatus of claim 15, wherein the end user data includes an Internet protocol address.

19. The apparatus of claim 15, wherein the second endpoint is prompted to respond to the request in order to initiate the communication session.

20. The apparatus of claim 15, wherein the communication session does not occur if the second endpoint declines the request.

21. The apparatus of claim 15, wherein the communication broker serves as an intermediary between the first and second endpoints during the communication session.

22. The apparatus of claim 15, wherein the communication broker is authorized to terminate the communication session.

23. The apparatus of claim 15, further comprising:
   a database operable to store a plurality of identities associated with a plurality of endpoints.

24. Logic for providing an intermediary between endpoints, the logic being embodied in a non-transitory computer readable medium and comprising computer code such that when executed by a processor in an electronic environment is operable to:
   receive from a first endpoint, via a SIP server, a request for a video/multimedia communication session involving a second endpoint, wherein the request specifies the first endpoint by a personal contact information comprising a SIP address, wherein the request includes the SIP address as a source address;
   identify end user data associated with the first endpoint, wherein the identifying includes accessing a database that verifies and retrieves the end user data, wherein the end user data includes a profile contact address, wherein the profile contact address is mapped to the personal contact information, and wherein the second endpoint is shown the profile contact address of the first endpoint and not the personal contact information associated with the first endpoint;
   translate the request, the translating comprising replacing the SIP address in the source address with the profile contact address; and
   transmit the translated request to the second endpoint, via another SIP server.

25. The logic of claim 24, wherein the code is further operable to:
   identify a second end user data associated with the second endpoint, wherein the second end user data is mapped to a second personal contact information of the second endpoint, wherein the second personal contact information comprises a second SIP address, wherein the request includes the second profile contact address as a destination address, and wherein the first endpoint is shown the second profile contact address of the second endpoint and not the second personal contact information associated with the second endpoint; and
   replace the second profile contact address in the destination address with the second SIP address.

26. The logic of claim 24, wherein the code is further operable to:
   prompt the second endpoint to respond to the request in order to initiate the communication session.

27. The logic of claim 24, wherein the communication session does not occur if the second endpoint declines the request.

28. The logic of claim 24, wherein the code serves as an intermediary between the first and second endpoints during the communication session.

29. The logic of claim 24, wherein the end user data includes an Internet protocol address.

* * * * *